Patented Apr. 4, 1950

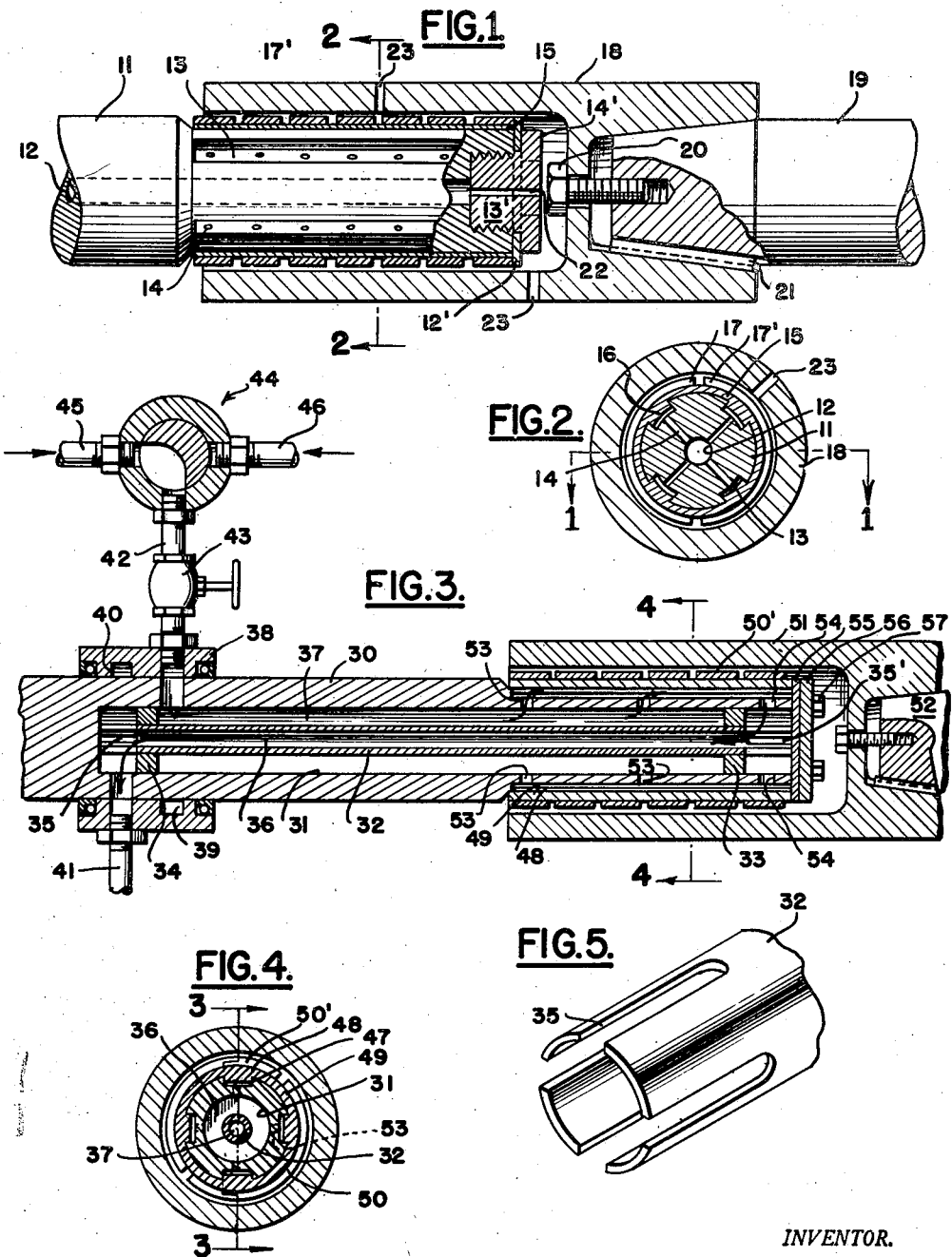

2,502,461

UNITED STATES PATENT OFFICE 2,502,461

THERMALLY ACTUATED FRICTION CLUTCH

Saul Allan Kane, Washington, D. C.

Application December 22, 1948, Serial No. 66,694

10 Claims. (Cl. 192—82)

(Granted under the act of March 3, 1883, as amended April 30, 1928; 370 O. G. 757)

This invention relates to a friction clutch, and more particularly to a thermally actuated clutch for frictionally connecting driving and driven members.

In high-torque power transmission devices, such as employed for example in ship propulsion machinery, it often becomes desirable to disconnect the driven device, such as the propeller, from the driving machinery particularly in the event of damage to either, not only to make repairs but to prevent the driven portion, such as the propeller, from turning the damaged unit and exerting a drag upon the vehicle; and in the event the driven parts require repair, the driving machinery can still continue to operate to run its auxiliary apparatus.

The present type of clutching units are not suitable for this form of power transmission: a plate-type friction clutch would be unsatisfactory for the reason that the overall size required to transmit the high torque would be excessive relative to the space and weight factors involved; a jaw-type clutch while suitable for this type of transmission is undesirable for clutching or declutching cannot be accomplished without stopping the propulsion unit, an unsatisfactory procedure as the propulsion unit often drives auxiliary apparatus; and a helical spring clutch being unilateral in operation cannot be employed with reversible driving units.

There is, therefore, a need for a clutch having suitable space and weight proportions that may be actuated irrespective of the speed or direction of rotation of the propulsion or the driven unit and one in which the torque-transmission capacity can be varied without substantially increasing its overall length.

An object of the invention therefore is to provide a clutching mechanism that will meet the aforementioned needs.

An additional object is the provision of a clutch that will be responsive to predetermined temperature ranges of a circulating or ambient fluid to connect or interrupt the transmission of power between driving and driven elements.

A still further object of the present invention is to provide a clutch mechanism that will function with a change in temperature to interrupt the flow of power between driving and driven parts.

A still further additional object is to provide a clutch with a thermally responsive element such as an expansible-contractible element.

Other attendant advantages of this invention will be readily appreciated as the same becomes better understood by reference to the following detailed description when considered in connection with the accompanying drawings in which like reference numerals refer to like parts throughout the figures and wherein:

Figure 1 is a longitudinal cross section of one embodiment of the invention taken on line 1—1 of Figure 2;

Figure 2 is a cross sectional view taken on line 2—2 of Figure 1;

Figure 3 is a longitudinal cross section of a modification taken on line 3—3 of Figure 4;

Figure 4 is a cross sectional view taken on line 4—4 of Figure 3; and

Figure 5 is a perspective view of an end portion of an element of Figure 3.

Referring to the drawings, a propeller shaft 11 connected to propulsion machinery, not shown, is provided with a bore 12 and a plurality of keyways or fluid channels 13 extending lengthwise of the shaft and spaced circumferentially about the shaft axis. The bore 12 is connected by a plurality of radial passages 14 to the channels 13. A sleeve 15 fits over the shaft 11 and is provided with a series of parallel keys 16 extending along its length. The keys 16 are received within the fluid channels 13, as more clearly shown in Figure 2, and can move into and out of these channels in a radial direction for a purpose to appear. The bore 12 is closed by a washer 12' and a threaded member 13' which is provided with a flange 14' for closing the fluid channels 13.

The material for sleeve 15 is selected for its high coefficient of expansion and such material can be any one of the copper base alloys, such as bronze. The reason for the requirement for such metal will become apparent as the description proceeds.

Fixed to the external periphery of the sleeve 15, by riveting or other suitable means, are a number of friction shoes 17, 17' which are adapted to engage the internal periphery of a tubular casing 18 attached to a driven shaft 19 by any suitable means, such as the bolt 20 and key 21.

To operate the clutch, suitably heated fluid, such as water or steam, is introduced into the bore 12 from whence it flows through the radial passages 14 into the channels 13 to contact the keys 16. The keys 16 will be heated and by conduction will raise the temperature of the sleeve 15 causing it to enlarge bodily toward the inner surface of the tubular casing 18. This expansion of the sleeve 15 will move the friction shoes 17, 17' against the inner surface of the tubular casing 18 with sufficient force to grip and turn it in unison with the driving shaft 11.

In the event steam is employed as the heating fluid for raising the temperature of the sleeve 15, the threaded member 13' is provided with a drain hole 22 for the drainage of any condensed steam. The tubular casing 18 is furnished with one or more drain holes 23 to allow for the escape of any fluid which if permitted to accumulate in the tubular casing may effect the efficiency of the friction shoes 17, 17'.

To disconnect the driven shaft 19, any suitable coolant, such as sea water, is fed into the bore 12 and reaches the channels 13, in the manner explained, to cool the keys 16. This in turn will decrease the temperature of the sleeve 15 and cause it to shrink, withdrawing the friction shoes 17, 17' from engagement with the tubular casing 18 and freeing the driven shaft 19.

As the heating and cooling fluids need be fed into the bore 12 with a minimum of pressure, fluid sealing devices, which would normally be employed between the keys 16 and the channels 13, are omitted for the reason that the leakage of fluid, if any, is of a negligible amount and does not affect the operation or efficiency of the unit.

As the operation of the clutch is dependent upon the expansion and the contraction of the sleeve 15, such operation may be made automatic by omitting the heating and cooling fluids and relying upon the temperature of the ambient atmosphere surrounding the clutch to cause the sleeve 15 to enlarge or shrink similarly as under the influence of the fluids in the bore 12.

In the embodiment of Figure 3 provision is made for positively circulating the fluid through the clutch. Thus, the propulsion shaft 30 provided with an enlarged axial bore 31 within which is located a tube or sleeve 32. The tube 32 is concentrically positioned within the bore 31 by a pair of spacer plugs 33, 34.

The plugs 33, 34 are made water-tight with both the bore 31 and the tube 32 thereby forming concentric passages 36, 37 through which fluid can flow. The ends of the tube 32, beyond the spacers 33, 34, are provided with a number of axially extending slots 35, 35', as more clearly shown in Figure 5, for a purpose to appear.

About the shaft 30 is a stationary sleeve 38 provided with annular passages 39, 40. The annular passage 40 is connected to a drain pipe 41 and the remaining annular passage 39 is filled with fluid from a feed pipe 42 provided with a reducing valve 43. The feed pipe 42 is connected to a conventional two-way valve 44.

Leading into the valve 44 are pipes 45 and 46 which are connected to any suitable source of hot and cold fluids. Thus, pipe 45 may be connected to any nearby steam or hot water line and the pipe 46 may be supplied with cold sea water.

As the operation of the clutch is dependent upon temperature changes rather than pressure, the reducing valve 43 in pipe 42 is used. However, the valve 43 may be omitted and the pipes 45, 46 connected directly to low-pressure lines carrying the fluids at the desired temperatures.

The end of the driving shaft 30 is constructed similar to that of Figures 1 and 2. It is, thus, provided with fluid channels 47 slidably receiving keys 48 attached to the expansible-contractible sleeve 49, to which are fastened friction shoes 50, 50 which are adapted to engage a tubular casing 51 attached to the driven shaft 52. These parts are similar to and function the same as those described in Figures 1 and 2.

To establish communication between the space separating the walls of the bore and tube, the outer chamber 36, and the channels 47, the shaft 30 is provided with one or more inlet passageways 53 and one or more outlet passageways 54. The end of the bore 31 is closed by a gasket 55 and a cap 56 fastened to the end of the shaft 30 by bolts 57.

Although the incoming fluid is introduced through pipe 42 and drained by pipe 41, resulting in the fluid flowing in the direction indicated by the arrows of Figure 3, the position of pipes 41 and 42 may be reversed and the fluid introduced into the annular passage 40 and drained through the annular passage 39.

As shown in Figure 3, the valve 44 is in a position to admit heated fluid from pipe 45 into feed pipe 42 from whence it flows into the chamber 37 for distribution through the inlet passages 53 to the channels 47 for heating the sleeve 49 as in Figure 1. The fluid from the channels 47 leave by way of the outlet passages 54 into the space of the bore 31 formed between the spacer 33 and the cap 56.

The fluid then passes through the slots 35' into the tube 36 for delivery through its other end slots 35 to the bore space, between the end of the bore 31 and the spacer 34, from whence it is drained off by pipe 41.

To interrupt the flow of power between the shafts 30 and 52, the valve 44 is operated to place the cold fluid pipe 46 in communication with pipe 42, as a result of which cold fluid will take the same path as already described for the heated fluid.

The sleeve 49 will function similarly to the sleeve 15 of Figure 1 to advance or to retract the friction shoes 50 from the tubular casing 51.

The torque-transmission capacity of the clutch may be varied to meet different requirements by varying the length of either expansible-contractible sleeve 15 or 49. Thus, for example, in Figure 3 to increase the ability of the clutch to transmit power, the sleeve 49 can be extended axially, and conversely, it may be shortened when power requirements so permit.

It should be understood, of course, that although the foregoing disclosure relates to preferred embodiments of the invention, numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therein.

Having thus described the invention, what is claimed is:

1. In a power transmitting mechanism, the combination of a driving shaft having an end portion and an axial bore therethrough for the reception of a fluid, a driven shaft in axial alignment therewith, a tubular casing secured to said driven shaft and concentrically surrounding said driving shaft end portion, a plurality of channels extending longitudinally of and spaced on said end portion, radial passages connecting said bore with said channels for distributing the fluid within said bore to said channels, a thermally expansible-contractible cylindrical sleeve about said end portion, a plurality of keys on the inner periphery of said sleeve depending into said channels for contact with the fluid therein whereby the diameter of said sleeve will vary with temperature of the fluid, a plurality of circumferentially-extending friction shoes spaced lengthwise of and attached to the outer periphery of said sleeve for movement therewith whereby upon expansion of said sleeve said friction shoes will drivingly engage said tubular casing.

2. In a power transmitting mechanism, the combination of a driving shaft having an axial bore for the reception of a fluid, a driven shaft in axial alignment therewith, a tubular casing secured to said driven shaft and positioned about driving shaft, a plurality of channels on said driving shaft, passages connecting said bore with said channels for distributing the fluid within said bore to said channels, a thermally expansible-contractible sleeve about said driving shaft, projections on said sleeve fitting into said channels for contact with the fluid therein, friction shoes on said expansible-contractible sleeve whereby expansion of the same will move said friction shoes against said tubular casing.

3. In a power transmitting mechanism, the combination of a driving shaft, a driven shaft, a sleeve secured to said driven shaft, grooves on said driving shaft, a thermally expansible-contractible means about said driving shaft, projections on said means engaging said grooves whereby expansion of said means will drivingly engage said sleeve.

4. In a power transmitting mechanism, the combination of a driving means, a driven means, and a thermally expansible-contractible means between said first pair of means, said expansible-contractible means being a sleeve about and driven by said driving means, said driven means being adapted for driving engagement by said expansible-contractible means upon thermal expansion of the same.

5. In a power transmission device, the combination of a driving shaft having an end portion and an axial bore therethrough, removable means on the end of said driving shaft closing said axial bore, a tube extending within and substantially the length of said axial bore, annular spacers in said axial bore at predetermined distances from the ends thereof supporting said tube in concentric relationship with said axial bore, the ends of said tube beyond the annular spacers being provided with slots, an annular stationary sleeve on said driving shaft having a first and a second annular groove, means connected to said first annular groove for alternately supplying the same with fluids of relatively higher and lower predetermined temperatures, an inlet passage in said driving shaft connecting said first annular groove with said bore intermediate the annular spacers therein, an outlet passage in said driving shaft connecting said second annular groove with said bore intermediate an end thereof and an annular spacer adjacent thereto, means on said annular stationary sleeve for draining the fluid from said second annular groove, a plurality of longitudinally extending channels circumferentially spaced on said end portion, inlet radial passageways connecting said channels with said bore intermediate said annular spacers for distributing the fluid within said bore and between said annular spacers to said channels, outlet radial passageways connecting said channels with said bore intermediate said removable means and an annular spacer adjacent thereto whereby the fluid from said channels flows into said tube, a thermally expansible-contractible sleeve on said end portion, a plurality of keys on the inner periphery of said sleeve depending into said channels for contact with the fluid flowing therein whereby the diameter of said sleeve will vary with the temperature of the fluid, a plurality of circumferentially-extending friction shoes attached to the outer periphery of said sleeve for movement therewith, a driven shaft in axial alignment with said driving shaft, a tubular casing secured to said driven shaft and concentrically positioned about said sleeve, whereby expansion of said sleeve will move said friction shoes into driving engagement with said tubular casing.

6. In a power transmission device, the combination of a driving shaft having a plurality of channels extending longitudinally and spaced circumferentially thereof, means circulating fluid through said channels, a thermally expansible-contractible sleeve about said driving shaft, keys on said sleeve depending into said channels for contact with the fluid flowing therein whereby the diameter of said sleeve will vary with the temperature of the fluid, friction shoes attached to said sleeve for movement therewith, a driven shaft, a tubular casing secured to said driven shaft and surrounding said sleeve, whereby expansion of said expansible-contractible sleeve will move said friction shoes into driving engagement with said tubular casing.

7. In a power transmission mechanism, the combination of a driving shaft having a bore, means within said bore dividing the same into concentric fluid chambers, longitudinally-extending channels circumferentially-spaced on said driving shaft, means connecting opposite ends of said channels with said fluid chambers, respectively, for circulating fluid through said channels, a thermally expansible-contractible cylindrical sleeve about said driving shaft, keys on said sleeve internally thereof and depending into said channels for contact with the fluid flowing therein whereby the diameter of said sleeve will vary with the temperature of the fluid, friction shoes attached to said sleeve for movement therewith, a driven shaft in axial alignment with said driving shaft, a tubular casing secured to said driven shaft and concentrically surrounding said sleeve, whereby upon expansion of said sleeve said friction shoes will drivingly engage said tubular casing.

8. In a power transmission mechanism, the combination of a driving shaft, a thermally expansible-contractible means drivingly connected to said driving shaft, said expansible-contractible means being a sleeve about said driving shaft, means circulating fluid in contact with said expansible-contractible means whereby the same will vary bodily with the temperature of the fluid, and a driven means adapted to be drivingly engaged by said expansible-contractible means.

9. In a power transmission mechanism, the combination of a driving shaft, a thermally expansible-contractible means drivingly connected to said driving shaft, a plurality of keys on the inner periphery of said expansible-contractible means, a plurality of grooves in said driving shaft for receiving said keys, means circulating fluid in contact with said keys whereby the expansible-contractible means will vary bodily with the temperature of the fluid, and a driven means adapted to be drivingly engaged by said expansible-contractible means.

10. In a power transmission device, the combination of a driving shaft, a driven shaft, a plurality of longitudinal grooves spaced circumferentially on said driving shaft, a thermally expansible-contractible sleeve about said driving shaft with projections engaging said grooves, friction shoes attached to said sleeve for movement therewith, a tubular casing secured to said driven shaft and surrounding said sleeve, whereby expansion of said expansible-contractible sleeve will move said friction shoes into driving engagement with said tubular casing.

SAUL ALLAN KANE.

REFERENCES CITED

The following references are of record in the file of this patent:

UNITED STATES PATENTS

| Number | Name | Date |
|---|---|---|
| 2,087,488 | Stanley | July 20, 1937 |
| 2,093,281 | Kreuser | Sept. 14, 1937 |
| 2,320,900 | Walz | July 1, 1943 |